US008050478B2

United States Patent
Li et al.

(10) Patent No.: US 8,050,478 B2
(45) Date of Patent: Nov. 1, 2011

(54) METHOD AND APPARATUS FOR TISSUE BORDER DETECTION USING ULTRASONIC DIAGNOSTIC IMAGES

(75) Inventors: Xin Li, Shenzhen (CN); Longfei Cong, Shenzhen (CN); Yu Zhang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 526 days.

(21) Appl. No.: 12/345,461

(22) Filed: Dec. 29, 2008

(65) Prior Publication Data
US 2009/0226058 A1 Sep. 10, 2009

(30) Foreign Application Priority Data
Mar. 5, 2008 (CN) .......................... 2008 1 0065771

(51) Int. Cl.
*G06K 9/00* (2006.01)
(52) U.S. Cl. ........................................ 382/131; 382/128
(58) Field of Classification Search .......... 382/128–134; 128/920, 922
See application file for complete search history.

(56) References Cited

U.S. PATENT DOCUMENTS
5,457,754 A * 10/1995 Han et al. ...................... 382/128

FOREIGN PATENT DOCUMENTS
| CN | 1509691 A | 7/2004 |
| CN | 1513421 A | 7/2004 |
| CN | 1882965 A | 12/2006 |
| WO | 03077766 A1 | 9/2003 |

OTHER PUBLICATIONS
Patent Abstracts of Japan 2006029991 A Feb. 2, 2006 Saitama Univ.
Patent Abstracts of Japan 2004337458 A Feb. 12, 2004 Olympus Corp.

* cited by examiner

*Primary Examiner* — David Mis
(74) *Attorney, Agent, or Firm* — Kory D. Christensen; Stoel Rives LLP (57) ABSTRACT

A method and apparatus for tissue border detection using ultrasonic diagnostic images includes searching an initial central point of a target region in an ultrasonic diagnostic image of a detected target and determining an initial region border based on the initial central point and with the initial central point being a pole, searching a position of a target region border along a polar line across the pole and from an initial region border, and calculating an energy function of intensity distribution at different positions, wherein a position corresponding to a minimum value of the energy function of the intensity distribution is the border position of the target region.

25 Claims, 9 Drawing Sheets

METHOD AND APPARATUS FOR TISSUE BORDER DETECTION USING ULTRASONIC DIAGNOSTIC IMAGES

CROSS-REFERENCE TO RELATED APPLICATIONS

The present application claims priority to Chinese Patent Application No. 200810065771.3, filed Mar. 5, 2008, for "Method and Apparatus for Tissue Border Detection Using Ultrasonic Diagnostic Images," which is incorporated herein by reference.

TECHNICAL FIELD

The present disclosure relates to ultrasonic diagnostic image analysis.

SUMMARY

A method and apparatus for tissue border detection using ultrasonic diagnostic images is disclosed.

DETAILED DESCRIPTION

Diagnostic ultrasound has become an important examination method for non-invasively showing the structure and the motion of the internal organs in a human body. Further quantitative analysis of the structure and function of these internal organs first requires delineation of their borders. For example, a quantitative analysis of the cardiac function needs to measure shape parameters, such as a cardiac ventricle cross-sectional area and the changes thereof during a cardiac cycle, which requires definitely identifying the endocardium border. In addition, the boundaries may also be used to keep track of any pathological change. Furthermore, 3D reconstruction of a human internal organ image also necessitates outlining the border of internal organs.

Endocardium border detection plays a more and more important role in the quantitative evaluation of the cardiac function. During cardiac examination, a clinician will choose to freeze and save image data for multiple cardiac cycles at the moment of the best image effect before calculating the endocardium border by means of a border detection module. Important indices, such as ventricular volume, cardiac output, ejection fraction, mean velocity of circumferential fiber shortening, etc., for evaluating the cardiac function may be estimated by combining the endocardium data with a mathematical model. The local momentum of the myocardium may be obtained by dynamically displaying the segmented borders for detecting regional wall motion abnormality in the coronary disease. In addition, the endocardium-based detection may further be expanded to obtain the epicardium, so that the motion vector of the pixel node inside the myocardium may be calculated by a tracking algorithm based on the endocardium and epicardium segmentation results. Furthermore, a change in the local myocardial function may be revealed by calculating the strain rate of the myocardium local motion. Acquisition of the above data is of great significance to the diagnosis of the cardiac disease.

The cardiac function parameters may be either measured directly on a 3D cardiac image (e.g., MRI, CT, Ultrasonic Diagnostic Image), or estimated on the basis of a left ventricle (LV) cross-sectional area measured on a 2D image by certain mathematical models. The former typically has a poor real time performance despite greater accuracy due to the directly measured volume, which is expensive and unfavorable for the real-time measurement of the cardiac function at different time frames during a cardiac cycle.

On the other hand, the latter is usually implemented on an ultrasonic imaging system. Despite its larger measurement error than that of the former due technique to the influence of the estimation model accuracy, the 2D echocardiogram is widely used in the clinical diagnosis of cardiac diseases in virtue of its advantages in lossless, real time performance and cost. A 2D image (intensity image, color blood flow image and Doppler tissue image) obtained by an ultrasonic imaging system is analyzed to extract the border of the LV, calculate automatically the LV cross-sectional area, and estimate parameters of a LV volume and the like with a mathematic model, thereby conveniently measuring the cardiac function at different times during a cardiac cycle, on the basis of which important clinical diagnosis parameters, such as cardiac output and ejection fraction, are obtained.

Existing ultrasonic imaging systems typically use a method of manually graphing LV border to implement the estimation of the cardiac volume. Although more accurate, this method is poor in repeatability and convenience, and is thus only applicable to the estimation of cardiac motion parameters for a few frames of image. Therefore, some ultrasonic imaging systems achieve automatic measurement of cardiac function parameters by automatically detecting the endocardium, so as to improve repeatability and convenience in diagnosis and provide a great number of important clinical diagnostic parameters, such as ventricular volume, cardiac output, ejection fraction, and mean velocity of circumferential fiber shortening, etc.

At the same time, the dynamic motion of the endocardium border can show the dysfunction of local cardiac motion. The endocardium automatic detection technology mainly includes detection and location of a myocardial characteristic point, an endocardium detection algorithm, and a quantitative calculation and display method of the cardiac function. Using a tissue intensity image obtained by B-mode imaging as an example, an aspect to the endocardium automatic detection is how to eliminate the noise interference and the effects of weak boundaries in an ultrasonic diagnostic image.

The endocardium automatic detection typically consists of several stages of image storage and reading, image pre-processing (e.g., processing of noise reduction, etc.), characteristic point detection, image border detection, and cardiac function calculation and displaying. The ultrasonic cardiac image is affected by such factors as reverberation, speckle noise, etc., hence has lower signal-to-noise ratio and blurred border information. A general gradient-field-based border detection method may easily run into the local extreme value, which makes it difficult to detect the endocardium completely.

According to one aspect of the present disclosure, a method for tissue border detection in ultrasonic diagnostic image includes searching an initial central point of a target region in an ultrasonic diagnostic image of a examined object. The method may also include detecting a target region border, with the initial central point being a pole, by searching the positions of a target region border along polar lines across the pole, and calculating the energy function of intensity distribution based on regions on both sides of the border, wherein, in each line, the position corresponding to a minimum value of the energy function of the intensity distribution is the border of the target region.

Searching the positions of the target region border may further include setting a depth on the ultrasonic diagnostic image of the examined object; calculating a local region mean intensity of the image from one side to another at a depth and determining a curve of changes in the mean intensity; and searching, on the curve of changes in the mean intensity, two local intensity maximum value points in first and second intensity continuously increasing regions, and searching a intensity minimum value point in a region between the two local maximum values; wherein the intensity minimum value point is determined as the initial central point of the target region.

During search for the initial central point in the target region, differences between the two local maximum values and the mean intensity minimum value may be constrained to be larger than a predetermined threshold value respectively.

An initial region border is set for the border searching along polar lines, which is a circular curve with the initial central point of the target region being a center of a circle, wherein a radius of the circular curve is one third to one fifth of a distance from the initial central point of the target region to the target region border.

During the detection of the tissue border along the polar line, the intensity of the initial central point may be subtracted from that of the intensity maximum value found on each polar line to give a intensity threshold value on each line; and the energy function of the intensity distribution may increase until beyond the threshold value in one step to reach the border and stop the detection.

The energy function of the intensity distribution may be a function of variance or the combination of variance and gradient of the image intensity. In addition, the energy function of the intensity distribution may be set within a region border, or be set outside a region border.

For border detection of other frames images in the sequence of ultrasonic diagnostic images, the border detected for the previous frame image may be used as an initial border, and a center of gravity detected for the previous frame image is used as an initial central point.

The method for detecting a tissue border using an ultrasonic diagnostic image may include acquiring a sequence of ultrasonic diagnostic images for a examined object, wherein the sequence of the ultrasonic diagnostic image may be a sequence of a 2D ultrasonic intensity image for a cardiac motion long axis two-chamber or four- chamber position, and the sequence of the image at least includes an end-systolic image and an end-diastolic image during one cardiac cycle.

The method may further include smoothing a collected sequence of ultrasonic diagnostic images for the examined object by using Gaussian filtering or anisotropic filtering.

In one embodiment, the method further may include manually correcting the position of the initial central point that is searched.

The method may include correcting intensities of points on the polar line prior to the detection of the border along the polar line. Correcting intensities may further include searching for a global intensity maximum value on an entire polar line from the initial point along the polar line; searching for a local intensity maximum value point in a first intensity continuously increasing region from the initial point along the polar line, determining the point as a correction point if the intensity of the point is more than half of the global intensity maximum value on the entire polar line; otherwise, continuing to search for the local intensity maximum value point of a next continuously increasing region until the point whose intensity is more than half of the global intensity maximum value on the entire polar line is found; and assigning the intensity value of the correction point to the intensity of point outside the correction point, or detecting the border in the region within the correction point.

In one embodiment, the method may further include smoothing and constraining the border of the detected target region in accordance with the energy function, wherein a shape constraint includes controlling the border shape by constraining an angle between the lines connecting the tissue border points on adjacent polar lines.

The method may further include manually adjusting border control points' positions after the detection of the border is completed to so as to optimize a border shape, the control points including some of the border points and the initial central point.

In one embodiment, the method may further include detecting a target structural characteristic point along the detected tissue border based on an angle or a curvature between adjacent border points so as to optimize a border shape, wherein the target structural characteristic point includes a lateral mitral valve and a medial mitral valve, or may be a specific structure of another tissue.

In one configuration, the method may further include displaying the tissue border and changes in the border with time.

According another aspect of present disclosure, an apparatus for detecting a tissue border using an ultrasonic diagnostic image may include a search module for searching an initial central point of a target region in an ultrasonic diagnostic image of a examined object, and determining an initial region border based on the initial central point. The apparatus may further include a detection module for, with the initial central point being a pole, searching positions of a target region border along polar lines across the pole and from an initial region border, and calculating an energy function of intensity distribution based on regions on both sides of the border, wherein, in each line, the position corresponding to a minimum value of the energy function of the intensity distribution is the border of the target region.

The apparatus may further include a collection module for collecting a sequence of ultrasonic diagnostic images for a examined object.

The apparatus may further include a smoothing module for smoothing a collected sequence of Ultrasonic diagnostic images for the examined object by using Gaussian filtering or anisotropic filtering.

The apparatus may further include a intensity correction module for correcting intensities of points on the polar line prior to the detection of the border along the polar line, characterized in that the intensity correction module performs operations of: searching for a global intensity maximum value on an entire polar line from the initial point along the polar line; searching for a local intensity maximum value point of a first intensity continuously increasing region from the initial point along the polar line, determining the point as a correction point if the intensity of the point is more than half of the global intensity maximum value on the entire polar line; otherwise, continuing to search for the local intensity maximum value point of a next continuously increasing region until the point whose intensity is more than half of the global intensity maximum value on the entire polar line is found; and assigning the intensity value of the correction point to the intensity of points outside the correction point, or detecting the border in regions within the correction point.

The apparatus may further include a smoothing and constraint module for smoothing and constraining the border of the detected target region in accordance with the energy function.

The apparatus may further include an optimization module for manually adjusting the border control points after the detection of the border is completed so as to optimize a border shape, the control points include some of the border points and the initial central point.

The apparatus may further include an identification module for detecting a target structural characteristic point along the detected tissue border based on an angle or a curvature between adjacent border points.

The apparatus may further include a display module for displaying the tissue border and changes in the border with time.

One embodiment of the present disclosure detects the tissue border based on the intensity field of an ultrasonic diagnostic image by calculating the energy function of the intensity, which depends rarely on the initial central point. Therefore, detection of the initial central point and the region structural characteristic point is simpler and faster. Detection of the tissue border based on the energy function may also better eliminate the effects of noises and weak boundaries in an ultrasonic diagnostic image. The disclosed method for correcting the intensities along the polar line may better eliminate the effects of uneven fields in an image. In addition, detection of the border along the polar line may greatly improve calculation speed. Finally, the method for correcting the intensities along the polar line may better eliminate the effects of uneven fields, which guarantees that there are only two tissues in the calculated region, thereby obtaining a stable border.

The embodiments of the disclosure will be best understood by reference to the drawings in which like numerals refer to like parts or steps throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail in order to avoid obscuring other aspects of the disclosure.

A skilled artisan will recognize that the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Certain aspects of the embodiments described herein may be implemented as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Figure 1:
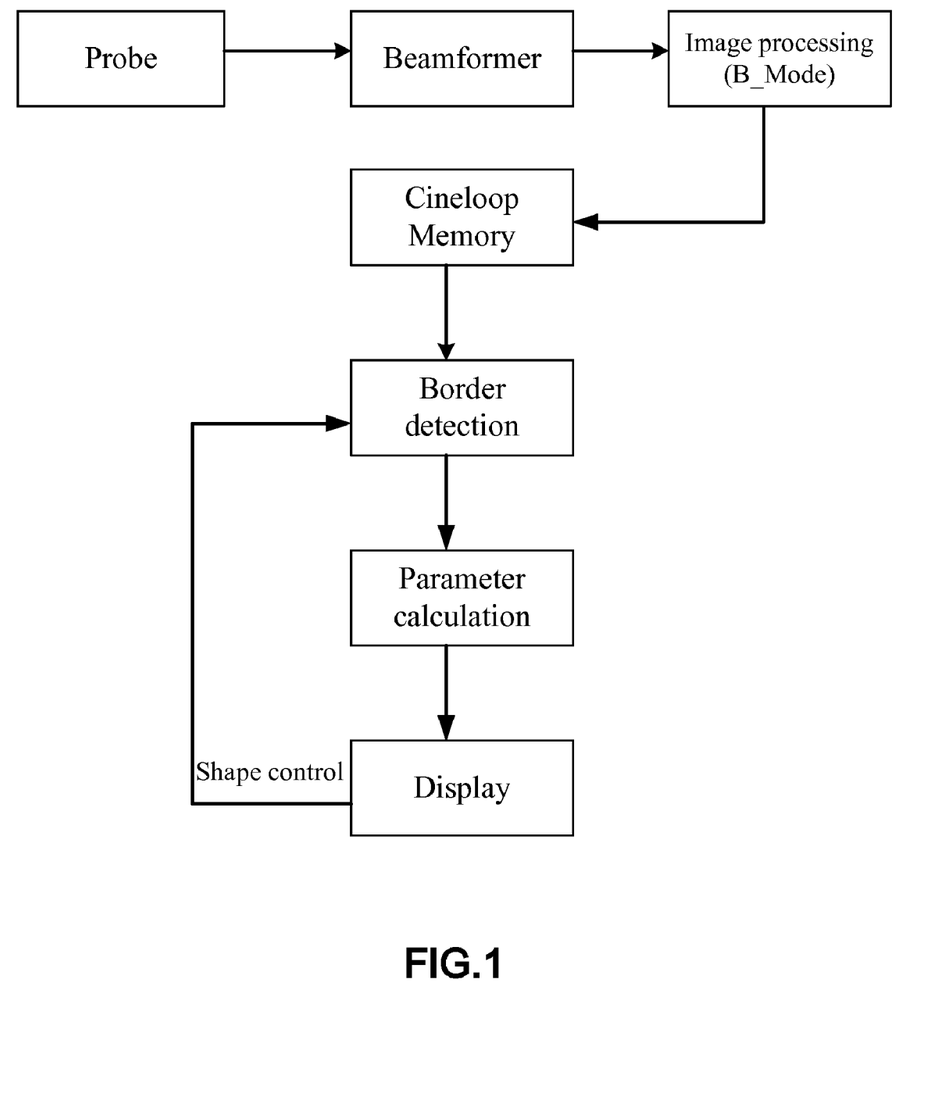
FIG. 1 is a data flow diagram of an ultrasonic endocardium automatic detection system.

FIG. 1 is a block diagram of a typical endocardium detection system. An ultrasound probe transmits ultrasound waves to a corresponding examined part (such as a heart) in a human body. Imaging may be triggered, for example, by an ECG trigger. The received echo signal is sent into an image processing module after undergoing such processing stages as pre-amplification, ADC conversion, and beamforming. Through non-Doppler signal processing, an intensity image of the anatomical structure for a human tissue (such as a heart) is obtained and saved in a cineloop memory. An automatic border detection module reads the image data for border detection and calculation, and a parameter calculation module calculates parameters of various functions (such as a cardiac function) based on the obtained border information and in combination with a data model. The resultant border information and functional parameters are displayed on a monitor. When an image sequence is processed, the position of the current image border is used as the initial value and position shape constraint for the segmentation of the subsequent images.

Figure 2:
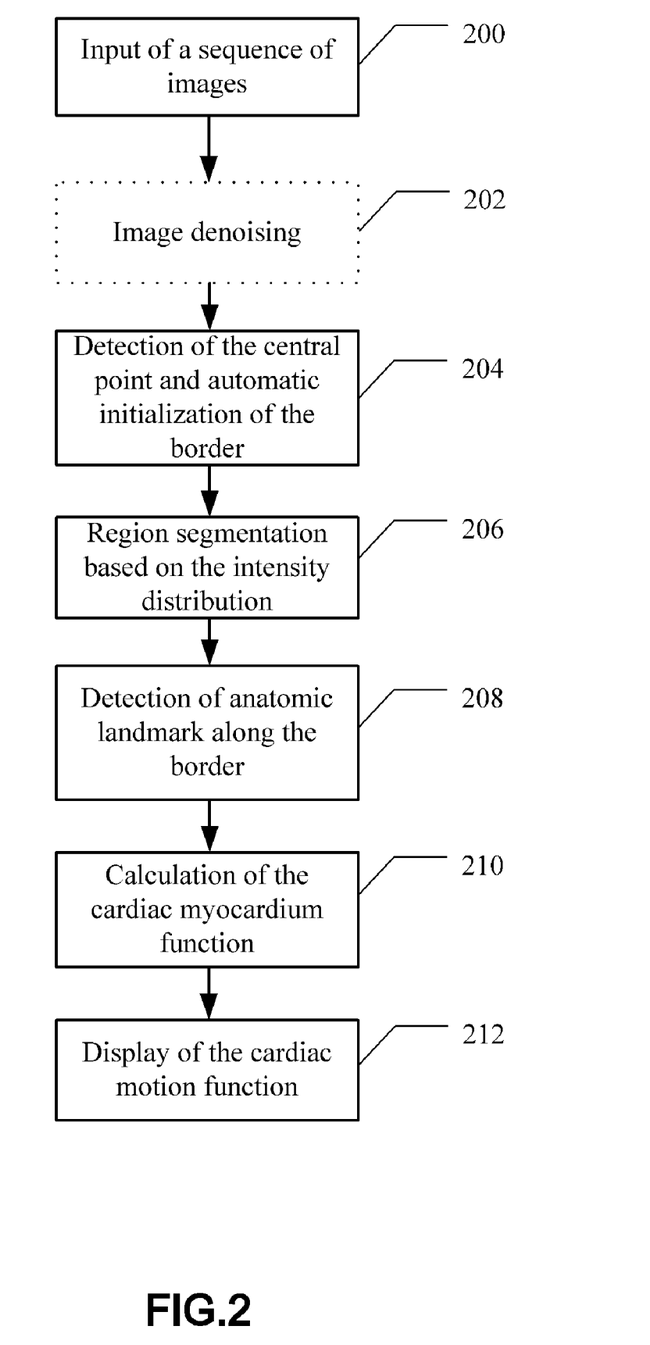
FIG. 2 is a flowchart of a method for ultrasonic endocardium automatic detection.

Referring to FIG. 2, a method for tissue border detection may include several sections of data reading 200, image denoising 202, initial position detection and border initialization 204, intensity-distribution-based region segmentation 206 (for example, segmenting an image into a left ventricular blood region and a myocardium region, and taking the boundaries of the two regions as the endocardium), characteristic point detection along a region border 208, cardiac function calculation 210 and cardiac motion function displaying 212, etc. A left ventricular long axis four-chamber or two-chamber position may be selected to be scanned in ultrasound examination on a cardiac function. The image data of several cardiac cycles may be frozen after acquisition of the myocardium image sequences of the best effect by adjusting image parameters. The myocardium image may be selected manually or triggered by an ECG signal automatically at a specific moment (e.g., cardiac early-systolic, end-systolic or end-diastolic) as the initial segmentation image.

In this example, the cardiac early-systolic (when the mitral valve is closed and the left ventricular shape is an ideal closed reverse "U") is selected for determination of the initial detection point and for region segmentation (i.e., border detection). If poor in quality, the image may be smoothed by Gaussian filtering or anisotropic filtering. Typically, the myocardium is a strong echo signal displayed in white while the blood is a weak echo signal displayed in black. When in the collected images the myocardium is displayed in black with lower intensities and the blood is displayed in white with higher intensities, the reverse color intensity conversion is performed to convert the myocardium region into a region with higher intensities and to convert the blood region into a region with lower intensities.

Figure 3:
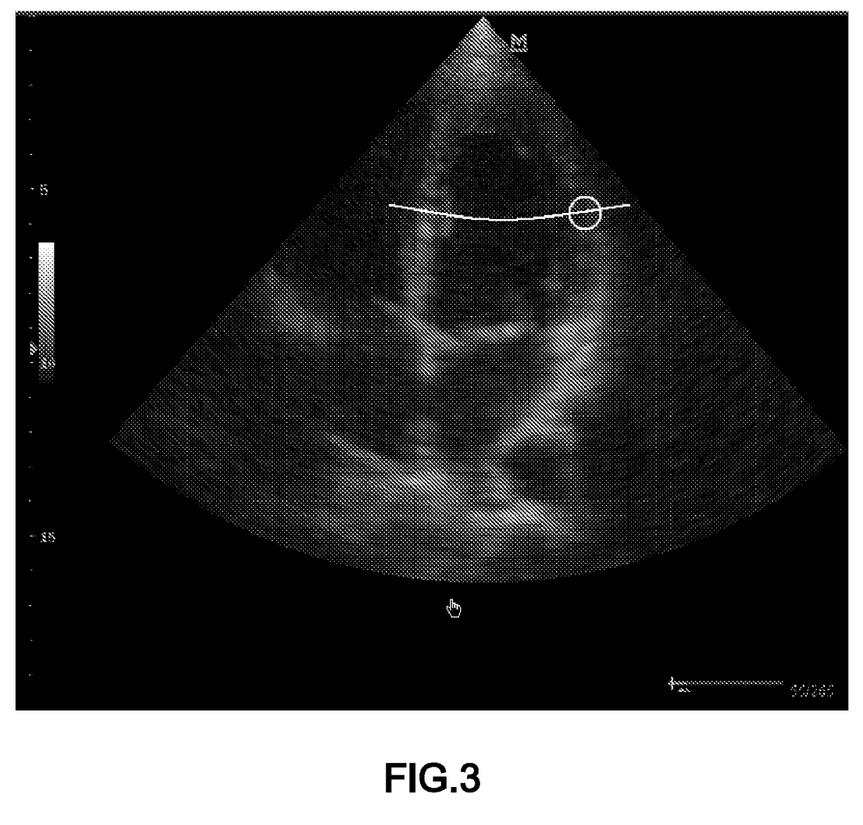
FIG. 3 shows an initial central point search region of an ultrasonic image.

As known from the position of the left ventricle in the four-chamber image (e.g., FIG. 3), the left ventricle is on the right side of the entire image, and the side wall of the left ventricle is close to the image border, that is, there is no other tissue image between the left ventricular myocardium and the image border, whereby an automatic search may be conducted for the left ventricular central point. On the first frame image, i.e., the cardiac early-systolic image, a depth range may be set in accordance with the left ventricular depth of an ordinary adult, on which the local mean intensity distribution of the image is calculated from one side to another (e.g., from left to right), to search for the position and line shown in FIG. 3.

Figure 4:
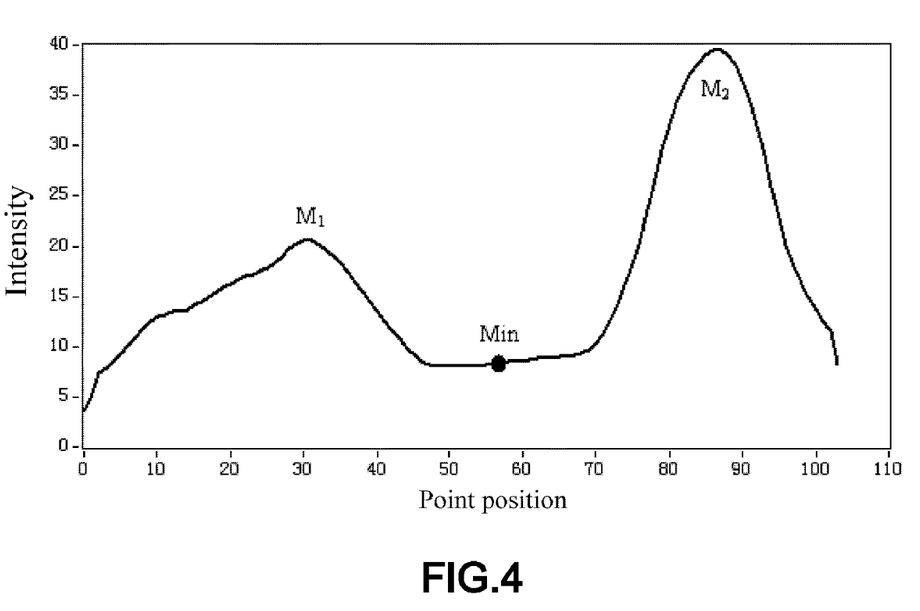
FIG. 4 is a graph of intensity distribution in an initial central point search region.

FIG. 4 illustrates the resulting curve of changes in the mean intensity that is searched and calculated along an arc line. From the curve of changes in the intensities, the maximum value points M1 and M2 of the intensities within the first and second intensity continuously increasing regions are first searched. Thereafter, the mean intensity minimal point Min is searched in the region between the two local maximum value points, which minimal point is set as the left ventricular center (i.e., the initial central point of the automatic detection position). During the search for the initial point, the intensity difference between the two local maximum values and the mean intensity minimum value is constrained to be larger than a certain threshold value (e.g., ⅕ of the intensity minimum value), so as to guarantee that the correct myocardium wall (the intensity maximum value point) and ventricular blood center (the intensity minimum value point) are to be found. The initialized regional border may be a circular curve centered around the initial point, and the radius of the curve may be set as one third to one fifth of the distance from the initial central point to the image border (since the method according to this embodiment does depend on the initial region border very much, there is no strict restriction to the size of the curve radius). The region of other frames of image may be segmented with the border between the blood and the myocardium region of the previous frame image as the initial border, and the gravity center of the border between the blood and myocardium region of the previous frame image as the initial point.

Figure 5:
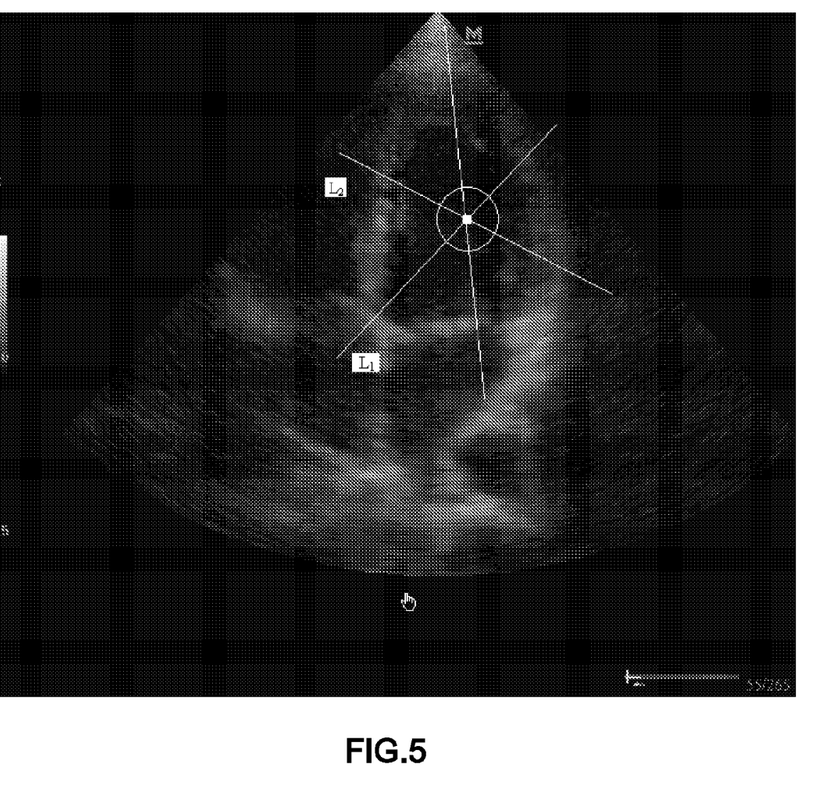
FIG. 5 illustrates detection of a border along a polar line.

To reduce the amount of calculations and increase the region segmentation speed, the initial point position may be used as the polar point after it is obtained to detect the endocardium along the polar line direction (the line radiated from the center of the circle as shown in FIG. 5), so that the detection of a 2D image border turns to the detection of a mark point position on a plurality of 1D curves. In one embodiment, the intensities of points on the polar line are first corrected prior to the segmentation along the polar line.

Figure 6:
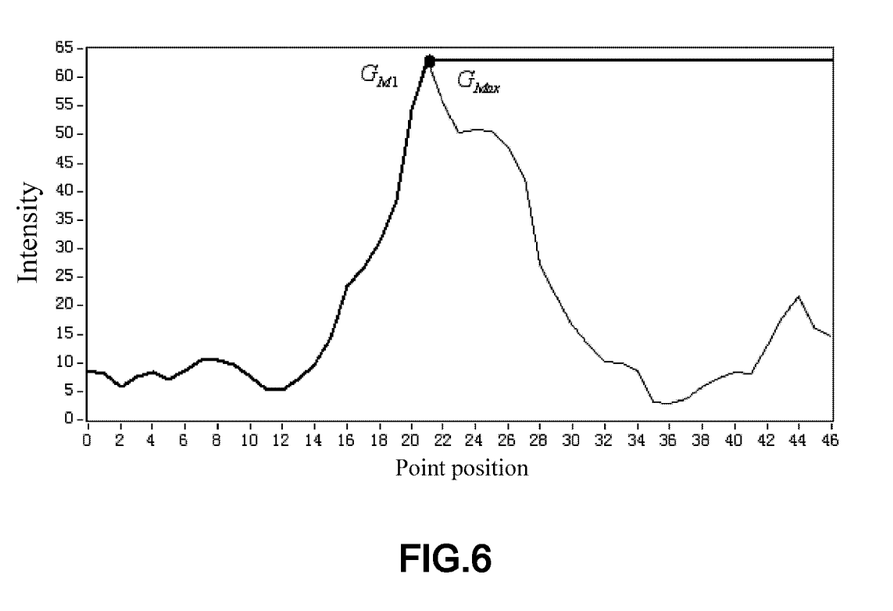
FIG. 6 is a graph of intensity distribution on a polar line.

In FIG. 6, the black line represents the intensity distribution of points along a line. First, the global intensity maximum value GMax on the entire line is searched from the initial point along the polar line; and then the local intensity maximum value point (at the myocardium position) of the first intensity continuously increasing region is searched from the initial point along the polar line, where the point is determined as the correction point GM1 (GMax and GM1 being the same point in FIG. 6) if the intensity of the point is larger than half of GMax; otherwise, the local maximum value point of the next continuously increasing region is to be searched until it meets the aforementioned conditions. The intensities of the points outside the correction point GM1 (i.e., all the points except those between the correction point and the pole) may be congruously set as the intensity value of the correction point GM1. With the intensity correction processing, it is understood that the current frame of ultrasonic echocardiogram includes only two portions of two continuous regions, i.e., the left ventricular internal blood region and the myocardium region (as shown in FIG. 6). Similarly, the energy function of the intensity distribution may be calculated only for the points within the correction point GM1 (i.e., the points between the correction point and the pole) during the process of region segmentation calculation.

As shown in FIG. 5, the initialized endocardium border contour may be a circular region with the initial point being the center of the circle. The circular initial contour divides the polar line L into inside(L) and outside(L). Let c1 be the mean value of the intensities in the internal region inside(L), c2 be the mean value of the intensities in the external region outside (L), u(l) be the intensity of $(x_l, y_l)$ (a point on the polar line), η be a weighting coefficient, and $$\left|\frac{\partial u}{\partial l}\right|_{l_0}$$

be a modulus of the intensity gradient of the border points $u(l_0)$ between the internal and external regions, then, the energy function of the border points on a certain line may be defined as:

$$F_1(c) = \int_{inside(L)} (u(l) - c_1)^2 d_l + \int_{outside(L)} (u(l) - c_2)^2 d_l - \eta \left|\frac{\partial u}{\partial l}\right|_{l_0}^2. \quad (5.1)$$

In one embodiment, the method assumes that an image is divided into two portions of foreground and background, each having uniform intensity distribution. It may be seen that at the border position of the foreground and background regions in an image, the first two items of the image intensity distribution function in the above energy function are minimal, whereas the modulus of the intensity gradient at the border point is maximal, i.e., the energy of the whole energy function is minimal. Therefore, starting from the initial border point, the position of the initial border is gradually changed outwards (or inwards) along the polar line direction, the energy function of the intensity distribution is repeatedly calculated, to search for the minimum values of the energy function of the intensity distribution at different positions. Accordingly, the position corresponding to the minimum value is defined as the border between the blood region and the myocardium region within the ventricle, i.e., the endocardium position.

Figure 7:
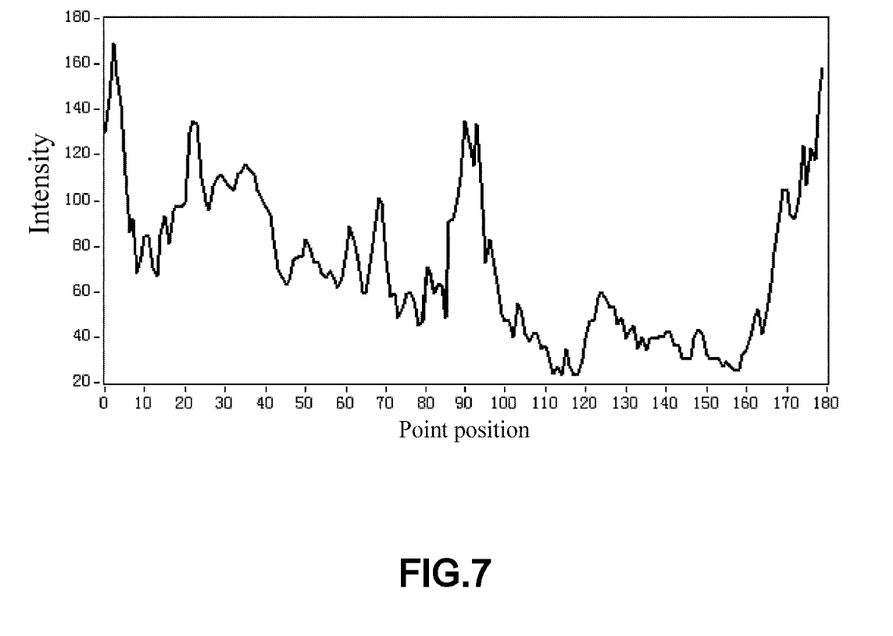
FIG. 7 is a graph of intensity maximum values on all polar lines.

Comparing the resulting maximum values of the intensities on each of the detected lines, it may be seen that the intensities are not distributed very evenly on the entire left ventricular myocardium, as shown in FIG. 7. Therefore, during the detection of the tissue border along the polar line, it may be required to use different threshold values for different positions. The intensity of the initial point is subtracted from that of the intensity maximum value point found on each polar line to give the intensity threshold value w on each line. After reaching the minimum position, the energy function increases until beyond the predetermined threshold value to reach the border and stop the detection, where η may be set in a linear relationship with the threshold value w. The threshold values set in the above conditions can serve to effectively eliminate the effect of the uneven luminance of the myocardium on the segmentation results. Next, the distance from the detected border point to the central point is smoothed by a smooth processing (e.g., median filtering) so as to remove the border burr.

This method may be simplified to rely on only the first part of the (5.1) function (naturally, it may also be simplified to rely on only the second part of the (5.1) function), that is, to consider only the intensity distribution of the ventricular blood region as in the following formula:

$$F_2(c) = \frac{1}{2\sigma^2} \int_{inside(L)} (u(l) - c_1)^2 d_l + \eta \left|\frac{\partial u}{\partial l}\right|^2_{l_0}. \quad (5.2)$$

The function is a part of Mumford-Shah function, wherein σ is the variance of the internal region. However, the method depends largely on the threshold value, so that this embodiment uses the former energy function of dual regions.

Figure 8:
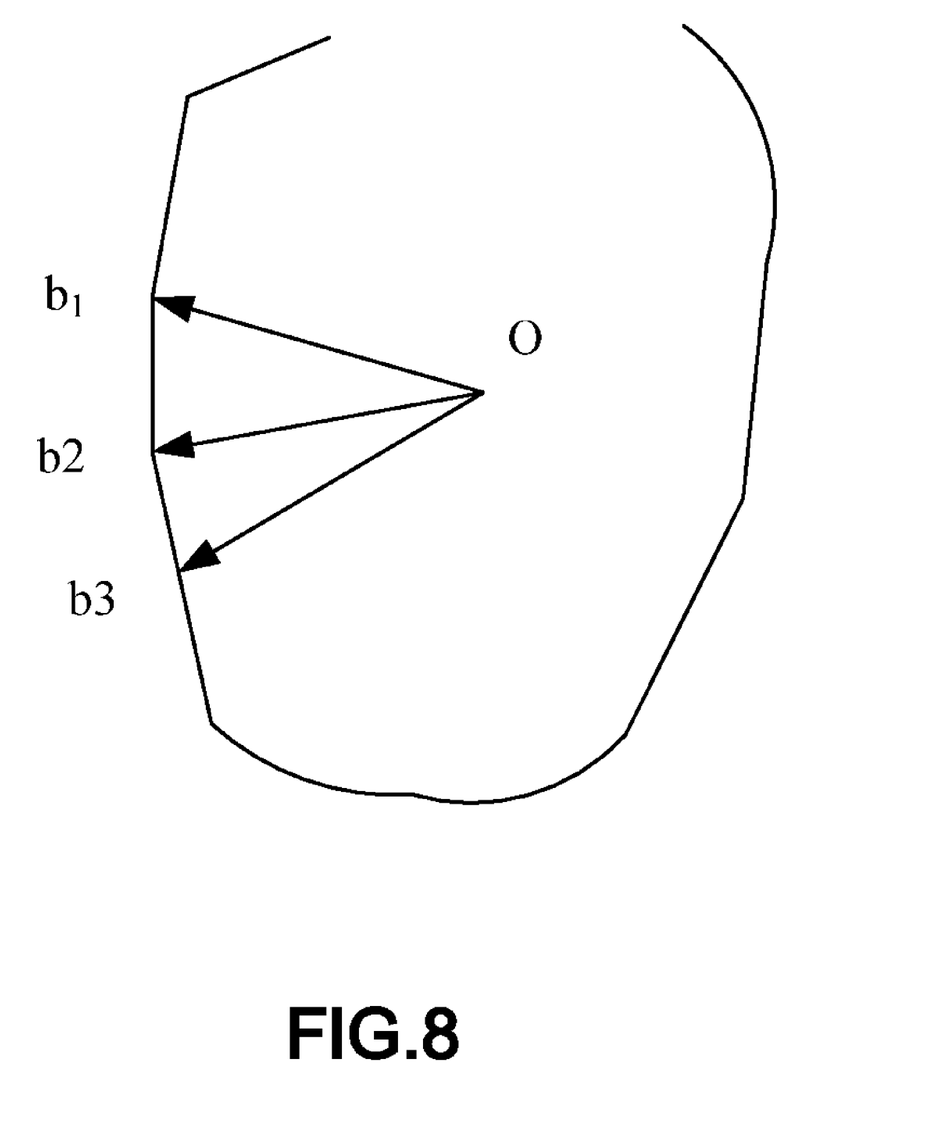
FIG. 8 is a graph of angle shape.

Since the endocardium border information is rather complicated, a certain shape constraint may be applied to avoid the leakage of the border. On the basis of the similarity of the cardiac images at successive frames, the energy function $F_3$ of the shape constraint may be defined as:

$$F_3(c) = \int_0^1 D(c(s), c^*(s)) \cdot c'(s) + (A(C(s)) - \pi)^2 d_s \quad (5.3)$$

where, $D(c(s),c^*(s))$ is the distance between the current border point $c(s)$ and the previous frame border point $c^*(s)$, and $A(c(s))$ represents the angle between the border point $c(s)$ and its neighboring point. In the function, the first item represents the constraint of the previous frame image to the image shape of the current frame, and the second part represents the smoothness constraint of the endocardium border, i.e., to avoid the occurrence of any sharp angle and border burr, which guarantees that the angle between the border point and its neighboring point is approximated to be π (into a straight line) as much as possible. For instance, the radian value of the angle $<b_1b_2b_3$ formed by the border points on three adjacent polar lines $o\vec{b}_1, o\vec{b}_2, o\vec{b}_3$ as illustrated in FIG. 8 may be calculated in accordance with the relational formula for triangular sides and angles. The function $F=F_1+\lambda F_3$ may be assumed to detect the endocardium border of subsequent frames of image. To speed up the region segmentation, this embodiment uses a multi-scales method which first detects the boundaries on a few polar lines and then detects the boundaries of the entire endocardium.

Figure 9A:
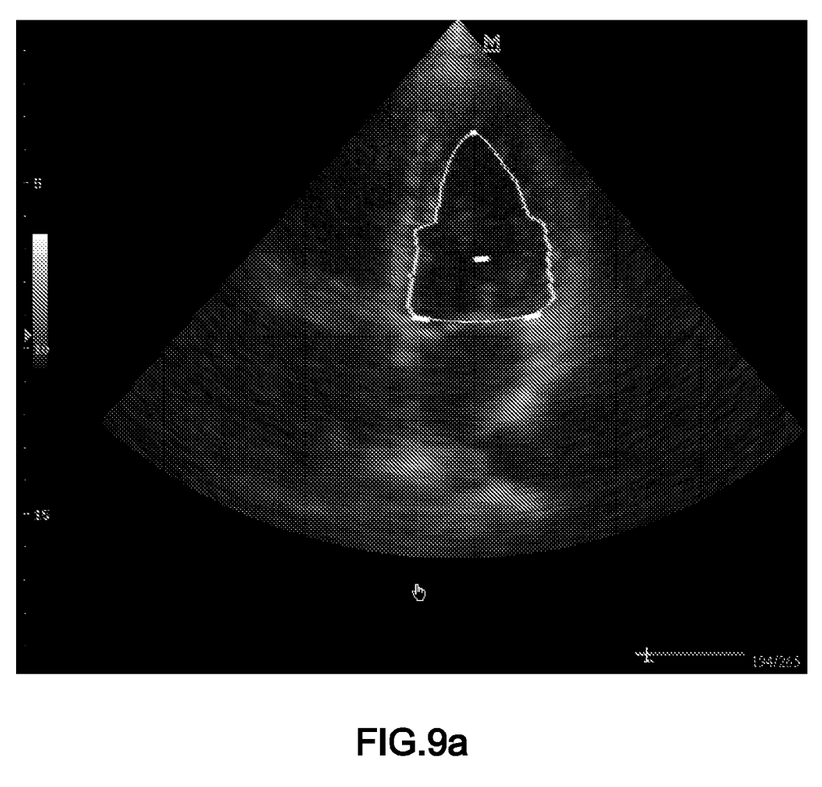
FIG. 9a and FIG. 9b show detection results of an endocardium border.
Figure 9B:
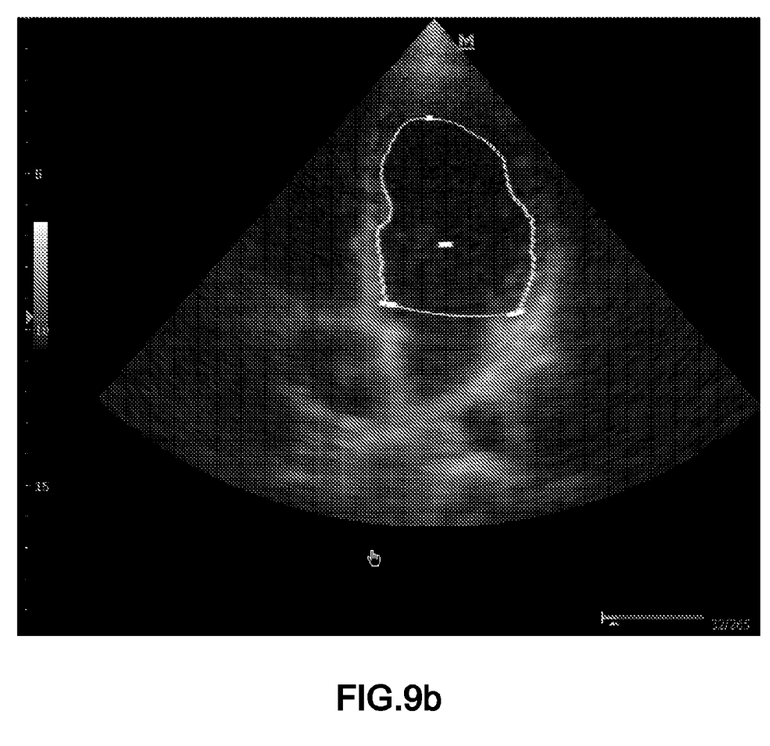

Such characteristic points of the tissue region as the medial mitral valve ring, the lateral mitral valve ring, and the ventricular apex may be detected along the detected boundaries. As in FIG. 8, the mitral valve is below the central point, so that the medial mitral valve ring and the lateral mitral valve ring are detected by calculating parameters like the $A(c(s))$ value or the curvature of the border point below the central point. Meanwhile, the farthest point from the line connecting two mitral valve ring points is detected along the detected endocardium border as the ventricular apex position. During the processing of the sequence of images, the position of the region characteristic point at a previous moment is used as the position constraint to the search for the characteristic points at subsequent moments, so as to solve such problems as unobvious mitral valve ring structural characteristics resulting from the opening of the mitral valve ring during the cardiac cycle. As in FIG. 9, the rectangular points are the characteristic points that have been found. The distance of the line connecting the ventricular apex and the mitral valve ring is used as the length T of the left ventricular long axis.

After the endocardium is segmented, the changes of the endocardium boundaries with images may be displayed dynamically or frame by frame. FIG. 9 shows the endocardium border image obtained using the method disclosed above. FIG. 9(a) shows the left ventricular systole, and FIG. 9(b) represents the diastole. It may be seen from the figures that the disclosed technique helps detect the endocardium border more accurately.

After the left ventricular border is obtained, the common myocardial function parameters may be calculated. For example, let the ventricular central point be the center of the circle and two adjacent border points constitute small triangles, the areas of the triangles are calculated and accumulated to obtain the area A of the long axis image left ventricular blood region, thereby obtaining the estimation of the left ventricular volume:

$$V = 0.85 \cdot \frac{A^2}{T} \quad (5.4)$$

In addition, the cardiac output $V_s=V_{max}-V_{min}$ and the ejection fraction $F=V_s/V_{max}$ may be further calculated on this basis, where $V_{max}$ and $V_{min}$ are respectively the maximum and minimum values of the ventricular volume.

After the segmentation is completed, the endocardium border highlighted displaying portion border point and the central point are defined as the control points (the mitral valve ring point and the ventricular apex are inevitably the control points), which allows adjusting the border control point position manually to optimize the border shape. Once the border point is adjusted, such parameters as the ventricular volume may be automatically recalculated. Once the position of the left ventricular central point in the image is adjusted, the current frame and the subsequent frames of image may be automatically recalculated and such parameters as the ventricular volume are calculated.

Figure 10:
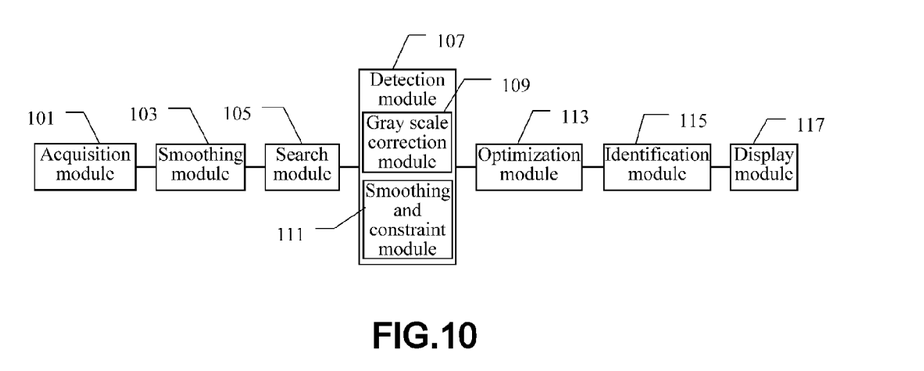
FIG. 10 is a block diagram of an apparatus for detecting a tissue border using an ultrasonic diagnostic image.

As shown in FIG. 10, the apparatus for detecting a tissue border using an Ultrasonic diagnostic image according to this embodiment comprises may include a search module 105 and a detection module 107, and optionally may further include a acquisition module 101, a smoothing module 103, a intensity correction module 109, a smoothing and constraint module 111, an optimization module 113, an identification module 115, and a display module 117, wherein the intensity correction module 109 and the smooth and constrain module 111 are sub-modules that may be included in the detection module 107.

The acquisition module 101 may be used to acquire the sequences of ultrasonic diagnostic images for a examined object. If the acquired ultrasonic diagnostic images are not sufficiently clear, the smoothing module 103 smoothes the acquired sequences of ultrasonic diagnostic images for the examined object using Gaussian filtering or anisotropic filtering. The search module 105 may be used to search the initial central point of the target region in the ultrasonic diagnostic image of the examined object and determine the initial region border based on the initial central point.

The detection module 107 takes the initial central point as the pole and changes the position of the initial region border in a predetermined step (such as the size of an image pixel) along the polar line across the pole and from the initial region border, while calculating the energy function of the intensity distribution at different positions, wherein the position corresponding to the minimum value of the energy function of the intensity distribution is the border of the target region.

Prior to the detection of the border along the polar line, the intensity of the points on the polar line may be corrected by the intensity correction module 109, which performs the following operations in the intensity correction: searching for the global intensity maximum value on the entire polar line from the initial point along the polar line; and then searching for the local intensity maximum value point of the first intensity continuously increasing region from the initial point along the polar line, wherein the point is determined as the correction point if the intensity of this point is more than half of the global intensity maximum value on the entire polar line; otherwise, the local intensity maximum value point of the next continuously increasing region is to be searched until it meets the aforementioned conditions; and assigning the intensity of the point outside the correction point as the intensity value of the correction point for the border detection, or performing the border detection just on the region within the correction point. In the case of the border detection, in order to avoid the occurrence of the border leakage, the smoothing and constraint module 111 may smooth and constrain the region border of the detected target in accordance with the energy function represented by the following equation:

$$F_3(c) = \int_0^1 D(c(s), c^*(s)) \cdot c'(s) + (A(C(s)) - \pi)^2 d_s,$$

where, $D(c(s),c^*(s))$ is the distance between the current border point $c(s)$ and the previous frame border point $c^*(s)$, $A(c(s))$ represents the angle formed by the border point $c(s)$ and its neighboring point, the first item represents the constraint of the previous frame image to the image shape of the current frame, and the second item represents the smoothness constraint.

After the border detection is completed, the optimization module 113 takes some of border points and the central point as the control points for manually adjusting the border control point position so as to optimize the border shape. The identification module 115 may be used to detect the target structural characteristic point along the detected tissue border based on the angle and curvature between adjacent border points. The display module 117 may be used to display the tissue border, changes of the border with time, and related parameters, wherein the related parameters include the following parameters that are calculated based on the detected tissue border: ventricular volume, cardiac output, cardiac ejection fraction, and mean velocity of circumferential fiber shortening.

This embodiment introduces a new endocardium border detection technology based on the features of an ultrasonic echocardiogram, which first detects automatically the left ventricular initial central point, and then detect quickly the border by searching along the polar line. The region segmentation function used in this embodiment can effectively avoid the effects of ultrasonic diagnostic image noises and detect the weak border. The threshold values along different polar lines can eliminate the field effects of the uneven distribution of intensities in an image.

Although the disclosure has been described above in connection with the examples of the endocardium detection, it is not intended that the disclosure be limited to these specific embodiments. Those skilled in the art should understand that the method and apparatus according to the present disclosure may also be used to detect boundaries of other tissues, for example, to detect the boundaries for the regions where the internal intensities are distributed uniformly, such as a blood vessel wall, the gallbladder, etc. In addition, the method and apparatus according to the present disclosure may also use other images to detect the tissue boundaries, such as MRI, CT images, etc. The disclosure is susceptible to some modifications, transformations, and equivalent replacements, etc., which, without departing from the spirit and scope of the present disclosure, should fall within the protection scope of the present disclosure.

What is claimed is:

1. A method for tissue border detection using ultrasonic diagnostic images, comprising:
    searching an initial central point of a target region in ultrasonic diagnostic images of a examined object; and
    detecting a border of the target region, with the initial central point being a pole, by searching positions of the target region border along polar lines across the pole, and calculating an energy function of intensity distribution based on regions on both sides of the border, wherein, in each line, the position corresponding to a minimum value of the energy function of the intensity distribution is the border of the target region.

2. The method according to claim 1, wherein the sequence of the ultrasonic diagnostic images is a sequence of a 2D ultrasonic intensity image for a cardiac motion long axis two-chamber or four-chamber position, which at least includes an end-systolic image and an end-diastolic image during one cardiac cycle.

3. The method according to claim 1, further comprising:
    smoothing an acquired sequence of ultrasonic diagnostic images for the examined object by using Gaussian filtering or anisotropic filtering.

4. The method according to claim 1, wherein searching further comprises:
    setting a depth on the ultrasonic diagnostic images of the examined object;
    calculating local mean intensity of the image from one side to another at a depth and determining a curve of the mean intensity; and
    searching, on the curve of the mean intensity, the local intensity maximum value points of the first and second intensity continuously increasing regions, and a intensity minimum value point in the region between two local maximum values;
    wherein the intensity minimum value point is determined as the initial central point of the target region.

5. The method according to claim 4, wherein, during search for the initial central point in the target region, differences between the two local maximum values and the mean intensity minimum value are constrained to be larger than a predetermined threshold value respectively.

6. The method according to claim 1, further comprising:
    manually correcting the position of the initial central point that is searched.

7. The method according to claim 1, wherein an initial region border is set for the border searching along polar lines, which is a circular curve with the initial central point of the target region being a center of a circle, and a radius of the circular curve is one third to one fifth of a distance from the initial central point of the target region to the target region border.

8. The method according to claim 1, further comprising correcting intensities of points on the polar line prior to the border detection along the polar line.

9. The method according to claim 8, wherein correcting intensities comprises:
searching for a global intensity maximum value on an entire polar line from the initial point along the polar line;
searching for an intensity local maximum value point in a first intensity continuously increasing region from the initial point along the polar line, determining the point as a correction point if the intensity of the point is more than half of the global intensity maximum value on the entire polar line; otherwise, continuing to search for the local intensity maximum value point of a next continuously increasing region until the point whose intensity is more than half of the global intensity maximum value on the entire polar line is found; and
assigning the intensity value of the correction point to the intensity of points outside the correction point, or detecting the border in the region within the correction point.

10. The method according to claim 1, wherein, during the detection of the target region border along the polar line, the intensity of the initial central point is subtracted from that of the intensity maximum value point found on each polar line to give a intensity threshold value for each line; and the energy function of the intensity distribution increases beyond the threshold value to reach the border and stop the detection.

11. The method according to claim 1, further comprising:
manually adjusting border control points' positions after the border detection is completed so as to optimize the border shape; wherein the control points include some of the border points and the initial central point.

12. The method according to claim 1, wherein the energy function of the intensity distribution is one of a function on the basis of a variance of an image intensity or a function on the basis of a variance and a gradient of the image intensity.

13. The method according to claim 1, wherein the energy function of the intensity distribution is one of the energy function on the basis of the intensity distribution within a region border, or the energy function on the basis of the intensity distribution outside a region border, or the energy function on the basis of the intensity distribution on both side of a region border.

14. The method according to claim 1, wherein, for border detection of other frame images in the sequence of ultrasonic diagnostic images, the border detected from the previous frame image is used as an initial border, and a gravity center of the border detected for the previous frame image is used as an initial central point.

15. The method according to claim 1, further comprising a smoothing and constraint step of smoothing and constraining the border of the detected target region in accordance with the energy function, wherein a shape constraint includes controlling the border shape by constraining an angle between the lines connecting the tissue border points on adjacent polar lines.

16. The method according to claim 1, further comprising:
detecting a target structural characteristic point along the detected tissue border based on an angle or a curvature between adjacent border points.

17. The method according to claim 1, further comprising:
displaying the tissue border and changes in the border with time.

18. An apparatus for detecting a tissue border using an ultrasonic diagnostic image, comprising:
a search module for searching an initial central point of a target region in an ultrasonic diagnostic image of a examined object; and
a detection module for, with the initial central point being a pole, searching positions of a target region border along polar lines across the pole, and calculating an energy function of intensity distribution based on regions on both sides of the border, wherein, in each line, the position corresponding to a minimum value of the energy function of the intensity distribution is the border of the target region.

19. An apparatus according to claim 18, further comprising:
a smoothing module for smoothing a collected sequence of ultrasonic diagnostic images for the examined object by using Gaussian filtering or anisotropic filtering.

20. An apparatus according to claim 18, further comprising:
an intensity correction module for correcting intensities of points on the polar line prior to the detection of the border along the polar line, wherein the intensity correction module:
searches for a global intensity maximum value on an entire polar line from the initial point along the polar line;
searches for a local intensity maximum value point of a first intensity continuously increasing region from the initial point along the polar line, determining the point as a correction point if the intensity of the point is more than half of the global intensity maximum value on the entire polar line; otherwise, continuing to search for the local intensity maximum value point of a next continuously increasing region until the point whose intensity is more than half of the global intensity maximum value on the entire polar line is found; and
assigns the intensity value of the correction point to the intensity of points outside the correction point, or detecting the border in regions within the correction point.

21. An apparatus according to claim 18, further comprising:
a smoothing and constraint module for smoothing and constraining the border of the detected target region in accordance with the energy function.

22. An apparatus according to claim 18, further comprising:
an identification module for detecting a target structural characteristic point along the detected tissue border based on an angle or a curvature between adjacent border points.

23. An apparatus according to claim 18, further comprising:
a display module for displaying the tissue border and changes in the border with time.

24. An apparatus according to claim 18, further comprising:
an optimization module for manually adjusting the border control points' positions after the border detection is completed so as to optimize the border shape; wherein the control points include some of the border points and the initial central point.

25. A system for tissue border detection using ultrasonic diagnostic images, comprising:
means for searching an initial central point of a target region in ultrasonic diagnostic images of a examined object; and
means for detecting a border of the target region, with the initial central point being a pole, by searching positions of the target region border along polar lines across the pole, and calculating an energy function of intensity distribution based on regions on both sides of the target region border, wherein, in each line, the position corresponding to a minimum value of the energy function of the intensity distribution is the border of the target region.

* * * * *